(12) United States Patent
Dietz

(10) Patent No.: US 7,146,843 B1
(45) Date of Patent: Dec. 12, 2006

(54) EXTREME LOW AIR PRESSURE DEADWEIGHT TESTER

(76) Inventor: Henry G. Dietz, 80 Salisbury Ave., Garden City, NY (US) 11530

( * ) Notice: Subject to any disclaimer, the term of this patent is extended or adjusted under 35 U.S.C. 154(b) by 0 days.

(21) Appl. No.: 11/294,196

(22) Filed: Dec. 6, 2005

(51) Int. Cl.
G01L 27/00 (2006.01)

(52) U.S. Cl. .................... 73/1.65; 73/1.68; 73/1.63

(58) Field of Classification Search ............ 73/1.65, 73/701, 1.63, 1.62, 1.57, 1.68
See application file for complete search history.

(56) References Cited

U.S. PATENT DOCUMENTS

| | | | | |
|---|---|---|---|---|
| 4,798,094 A | * | 1/1989 | Newhall et al. ....... | 73/862.584 |
| 4,815,313 A | * | 3/1989 | Beard .................. | 73/1.62 |
| 5,025,654 A | * | 6/1991 | Haefner ............... | 73/1.65 |
| 5,259,235 A | * | 11/1993 | Kolb ................... | 73/1.65 |
| 6,848,292 B1 | * | 2/2005 | Joseph et al. ......... | 73/1.57 |

* cited by examiner

*Primary Examiner*—Hezron Williams
*Assistant Examiner*—Ryan Christensen

(57) ABSTRACT

The present invention relates to Deadweight Pressure Testers used for the calibration of air pressure transducers. An air pressure transducer, which is to be calibrated, is set in parallel with the deadweight tester. Air is slowly pumped into the cylinder and the pressure inlet of the said pressure transducer to be calibrated. The air, which enters the cylinder under pressure, exerts a force on the cylindrical piston, thereby lifting the piston and balancing it against the air pressure. This force is balanced by the weights loaded on the top of the cylindrical piston. When the air pressure and the weights balance, the air pressure is known from the weights and the diameter of the cylindrical piston. A thin rubber seal allows for low friction and low air loss providing greater accuracy in measurements.

2 Claims, 4 Drawing Sheets

BRASS WEIGHT OF 231.4 GRAMS
FOR 1" WATER COLUMN

EXTREME LOW AIR PRESSURE DEADWEIGHT TESTER

BACKGROUND OF THE INVENTION

Hitherto known systems for calibration of pressure transducers used in pressurization monitors for cleanroom use are usually pressurized relative to adjacent space to points of leakage. Single cleanrooms are often pressurized at 0.05" water column according to surroundings. Pressurizing can be as low as 0.02" water column and the highest pressure of 0.1" water column is rare. Since present day deadweight pressure testers can only measure pressure in inches of water column and not the extreme low pressures of clean rooms they can't be used for calibration of clean room monitors. Instead the cleanroom monitors are usually subject to calibration by electronic devices that use secondary calibration and not the primary calibration traceable to NIST standards used by this invention that can measure pressures as low as 0.001" water column.

The Extreme Low Air Pressure Deadweight Tester invention can be calibrated to be traceable to NIST standards. Deadweight testers are generally regarded as the most accurate method in calibration of pressure instruments, and often are used as a primary pressure standard. The operating principle is that a vertically free floating piston in a cylinder is pushed upward when air pressure acts on the weighted piston. The piston must float freely in its cylinder. The pressure in the circuit will be determined by the weights loaded on the piston divided by the affected area of the piston with corrections for temperature and local gravity. The problem is that today's testers will not work for extreme low pressures because air escapes between the piston and the cylinder and if an attempt is made to reduce air loss it results in high friction. Also piston has weight greater than the required low weight for extreme low pressure.

The Extreme Low Air Pressure Deadweight Tester has it's diaphragm type piston weight balanced out to zero weight which allows very low weights to be loaded on a diaphragm type piston for extreme low air pressure measurements. The use of a 0.002" thick silicone rubber seal between a diaphragm type cylinder and a diaphragm type piston with a limited movement of a few thousandths of an inch result in no air loss and reduces the friction between piston and cylinder to almost zero. A pair of gold contacts that are normally closed will open when air pressure above the set value is applied which will turn off a red LED when the desired operation pressure is obtained. This Extreme Low Air Pressure Deadweight Tester has a range of 0.001" water column to 1.00" water column and can have an accuracy of 0.001% of the full range. The Extreme Low Air Pressure Deadweight Tester can be made for higher pressures as required.

Figure 1:
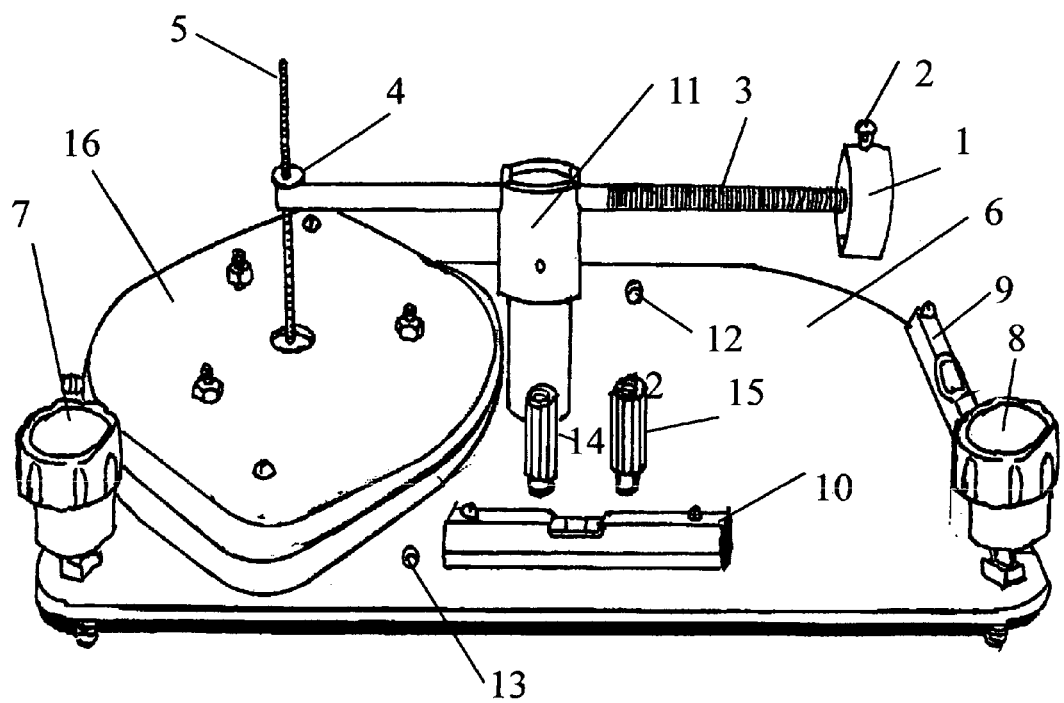
FIG. 1 is a perspective view of the Extreme Low Air Pressure Deadweight Tester, constructed in accordance with the present invention, that can measure pressure as low as 0.001 inch water column traceable to NIST standards.
Figure 2:
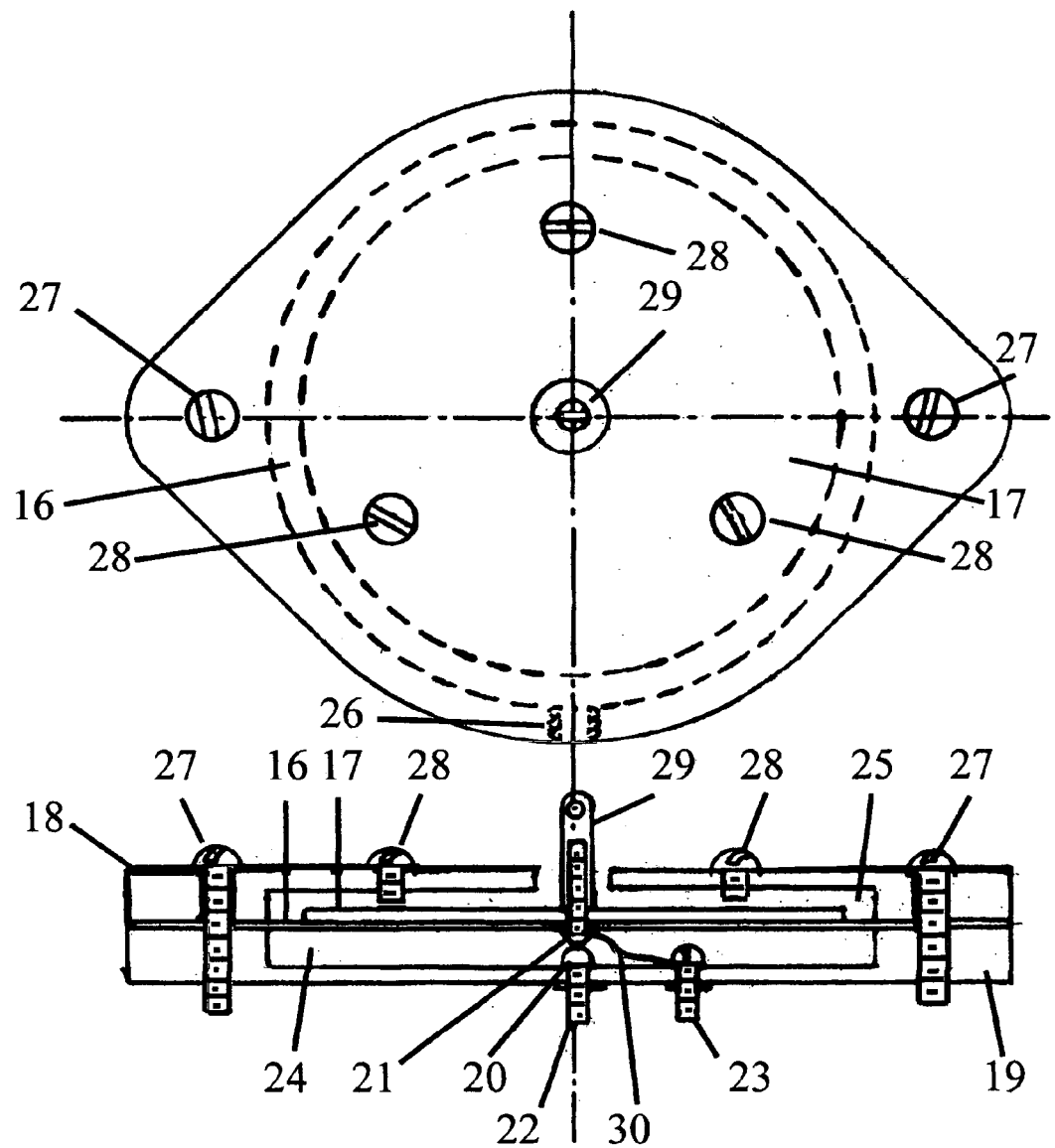
FIG. 2 shows the assembly of a diaphragm type cylinder, and a diaphragm type piston, and the extremely thin silicone rubber seal that prevents air flow between the said cylinder and piston. It also shows how low friction is obtained between the cylinder and the piston by use of an extremely thin silicone rubber diaphragm that has a very limited movement.
Figure 4:
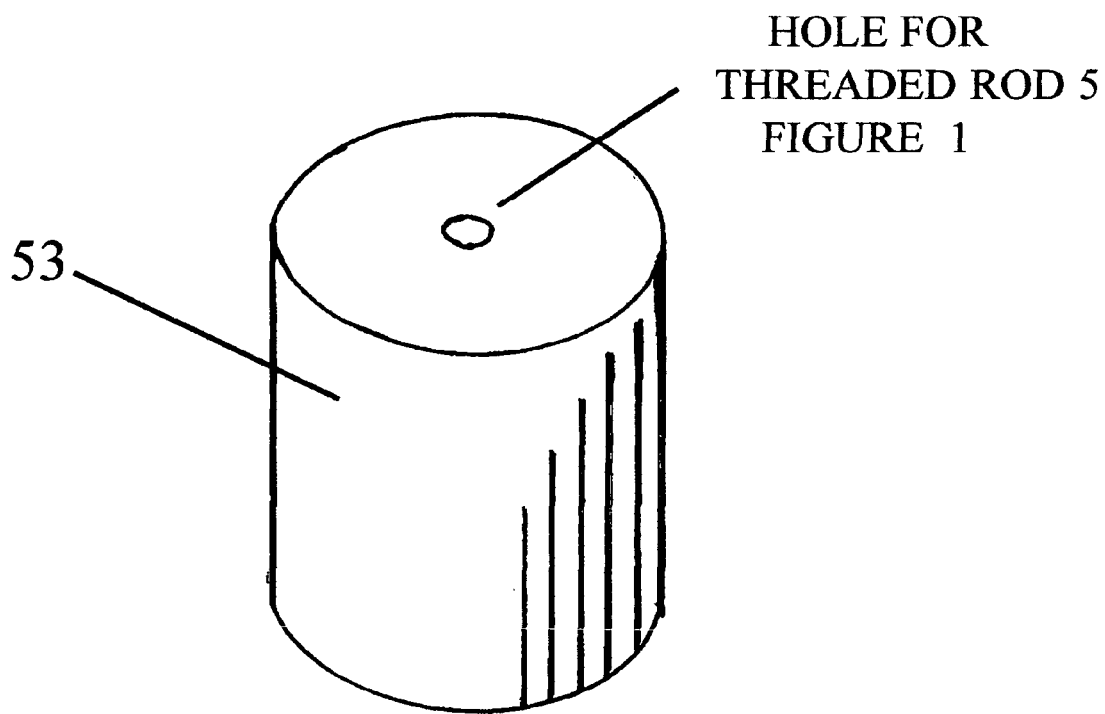
FIG. 4 is a brass calibration weight traceable to NIST standards, which is used to exert pressure on the piston of the deadweight tester

The air pressure is determined by the weight 53 of FIG. 4, being placed on threaded rod 5 of FIG. 1 to load the piston 17 of FIG. 2 divided by the effective area of the piston. A piston with an effective area of 91.189 square centimeters when loaded with 231.4 grams will give a weight of 2.53756 grams which converts to 1.0" water column (60 Deg. F.). To obtain weights for other inches of water it is only necessary to multiply 231.4 grams by inch of water column. Thus, for 0.5" water column multiply 231.4 by 0.5 which gives the required weight loaded on the piston of 115.7 grams. Likewise for 0.001" water column the required weight would be 0.001 multiplied by 231.4 or 0.2314 grams, etc. The weights can be traceable to NIST standards making the Extreme Low Air Pressure Deadweight Tester a primary standard.

Manometers using water or mercury can not detect extreme low pressures, because the density will vary with temperature, the fluid will adhere to the glass tubing, and measurement of the change in height of the fluid is difficult to detect at pressures of 0.001" water column. Most electronic manometers are secondary standards using metal diaphragms with extremely small movement that must employ electronic amplifying to detect movements of 0.001" water column.

BRIEF SUMMARY OF THE INVENTION

The present invention relates to Deadweight Pressure Testers used for the calibration of air pressure transducers. This system uses a cylindrical piston and a vertical hollow cylinder which is air filled. An air pressure transducer, which is to be calibrated, is set in parallel with the deadweight tester. Air is slowly pumped into the cylinder and the pressure inlet of the said pressure transducer to be calibrated. The air, which enters the cylinder under pressure, exerts a force on the cylindrical piston, thereby lifting the piston and balancing it against the air pressure. This force is balanced by the weights loaded on the top of the cylindrical piston. When the air pressure and the weights balance, the air pressure is known from the weights and the diameter of the cylindrical piston. The pressure of the air thus being known, the pressure transducer can be calibrated. The cylindrical piston can be loaded with various known weights traceable to NIST standards, and the pressure transducer can be calibrated against the corresponding pressure values. The disadvantage of this arrangement is the error involved in the estimated air pressure due to frictional resistance offered to the motion of the cylindrical piston in the vertical hollow cylinder. This error can be minimized if the cylindrical piston is carefully ground so as to fit with the least permissible clearance in the vertical hollow cylinder, but not completely removed. The present day deadweight air pressure testers can measure pressures only in inches of water column and not extreme low air pressures of 0.001 inch water column (½,000 of an ounce per square inch) because the weight of the cylindrical piston can not be made to have zero weight and it is impossible to have no air lost between the cylindrical piston and the cylinder without extreme friction. The present invention relates to having a cylindrical piston having no weight and no air loss between the cylindrical piston and the cylinder with minimum friction, resulting in creating an Extreme Low Air Pressure Deadweight Tester that can measure pressure as low as 0.001 inch water column traceable to MST standards.

The Extreme Low Air Pressure Deadweight Tester overcomes the problems of present day deadweight testers which can not measure extreme low air pressure. One of the problems is that the piston in today's deadweight testers can not prevent air leakage between the piston and the cylinder. If there is no air loss there is high friction between the piston and the cylinder making it impossible to detect extreme low pressure. The claimed invention overcomes this problem by using a 0.002" thick rubber diaphragm type seal between the piston and the cylinder, resulting in no air leakage. There is no high friction between the moving piston and the cylinder because the thin seal moves only a few thousandths of an inch to open a pair of gold contacts.

The weight of the piston in the Extreme Low Pressure Deadweight Tester is balanced out to have zero weight. Many present day deadweight testers have a weighted piston that make it impossible to obtain zero weight for low pressure measurements.

DETAILED DESCRIPTION OF THE INVENTION

With reference to FIG. 1 a drawing of the present invention; numeral 6 of that drawing is the base. It is provided with two adjustable knobs 7 & 8 and a fixed screw to provide a means for leveling the base using liquid levels 9 & 10. A support 11 provides a pivot for the brass rod 3, which is threaded at one end to allow for the adjustment of the thread weight 1 with means for locking it in place with screw 2. The other end of the brass rod is provided with a threaded nut 4 on threaded rod 5. Threaded rod 5 is fastened to the piston 2 of FIG. 2. Two holes 12 & 13 of FIG. 1 are provided in the base 6 for fastening to a flat horizontal surface. Electrical terminals 14 & 15 of FIG. 1 are connected to the two normally closed gold contacts 5 & 6 of FIG. 2. Assembly 16 of FIG. 1 is fully described in FIG. 2.

FIG. 2 is a drawing of the piston and cylinder assembly of the present invention. Numerals 18 & 19 of FIG. 2 are the vertical hollow cylinder. Numeral 17 of FIG. 2 is the cylindrical piston. Numeral 16 of FIG. 2 is the 0.002" thick silicone rubber seal. Numeral 24 of FIG. 2 is the pressure chamber which has a threaded hole 26 of FIG. 2 in the lower cylinder 19 of FIG. 2 for attachment to a fitting to accept the pressure being measured. The two screws 27 of FIG. 2 are used to fasten cylinder top 18 of FIG. 2 to the cylinder bottom 19 of FIG. 2 with the silicone rubber between the top and bottom. Screws 27 of FIG. 2 are also used to fasten the vertical hollow cylinder to FIG. 1 base 6. There are two normally closed contacts 20 & 21 of FIG. 2. The bottom contact 20 of FIG. 2 has a threaded section 22 of FIG. 2 which allows it to be used as an electrical terminal. The top contact 21 of FIG. 2 has a threaded end that allows it to be screwed into part 17 that is connected to the threaded rod 5 of FIG. 1. Hire 15 of FIG. 2 connects to contact 21 of FIG. 2 and the electrical terminal 23 of FIG. 2. The screws 28 of FIG. 2 limit the movement of the piston 17 of FIG. 2 to a movement of a few thousandths of an inch. Space 25 of FIG. 2 is open to the atmosphere.

A deadweight tester is the most fundamental pressure measurement technique, and favored as well for primary calibration of pressure sensors. It uses calibrated weights that exert pressure on a piston. Deadweight testers can be used as primary standards because the factors influencing accuracy are traceable to standards of mass, length, and time. However, for extreme low pressures they can't overcome the problem that the air will leak, or there will be high friction which makes present day deadweight testers unable to detect extreme low pressure. This invention overcomes this problem and can measure air pressures as low as 0.001" water column.

Figure 3:
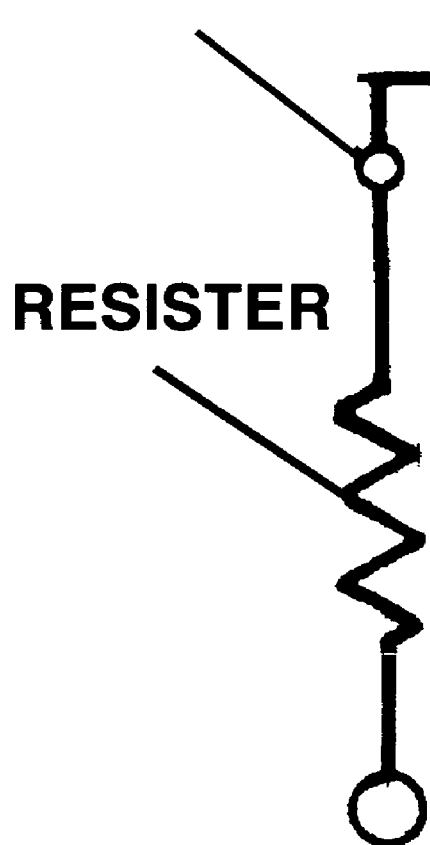
FIG. 3 shows the electrical circuit that illuminates a LED when pressure is below the set pressure. When pressure being measured is reached the contacts are opened, and the LED goes out.
Figure 3:
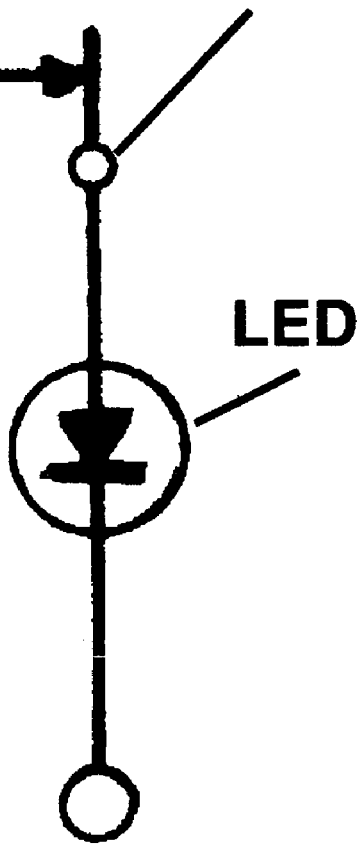

To use the Extreme Low Air Pressure Deadweight Tester it is first necessary to use the adjusting knobs 7 & 8 of FIG. 1 to make the base level. The terminals 14 & 15, of FIG. 1 which are connected to gold contacts 20 & 21 of FIG. 2 are connected to the circuit of FIG. 3. The piston 2 of FIG. 17 is adjusted to have zero weight by adjusting threaded weight 2 of FIG. 1 and having the LED go out. A weight is loaded on the piston. An adjustable air supply is connected to 26 of FIG. 2. When the LED goes out the air pressure is the value determined by the weight loaded on the piston.

I claim:

1. An extreme low pressure dead weight tester, comprising:
  a cylinder containing a piston; a means connected to both said cylinder and said piston for preventing air loss between said piston and said cylinder, wherein said means for preventing air loss includes a silicone rubber seal about 0.002 inches thick, wherein said silicone rubber seal produces extremely low friction by only moving a few thousandths of an inch during operation; a means to fluid couple the cylinder with a pressure transducer under test; a means connected to said piston for canceling said pistons weight, wherein said means for canceling said pistons weight include a means for attaching at least one weight for balancing the weight of said piston against said at least one weight; wherein said extreme low air pressure tester can be used to detect air pressure as low as 0.001 inches water column.

2. An extreme low air pressure tester according to claim 1, wherein an out of balanced position between the piston and the at least one weight for balancing the piston is indicated by opening a pair of normally closed contacts.

* * * * *